United States Patent
Hallot et al.

(10) Patent No.: US 7,069,957 B2
(45) Date of Patent: Jul. 4, 2006

(54) THERMAL INSULATION DEVICE FOR AT LEAST ONE UNDERWATER PIPE COMPRESSING SEALED PARTITIONS

(75) Inventors: Raymond Hallot, La Ciotat (FR); Xavier Rocher, Chatou (FR); Xuan Chi Nguyen, Ville D'Avray (FR)

(73) Assignee: Saipem S.A., Montigny le Bretonneux (FR)

( * ) Notice: Subject to any disclaimer, the term of this patent is extended or adjusted under 35 U.S.C. 154(b) by 338 days.

(21) Appl. No.: 10/469,672

(22) PCT Filed: Mar. 8, 2002

(86) PCT No.: PCT/FR02/00838

§ 371 (c)(1),
(2), (4) Date: Sep. 2, 2003

(87) PCT Pub. No.: WO02/073084

PCT Pub. Date: Sep. 19, 2002

(65) Prior Publication Data

US 2004/0076476 A1    Apr. 22, 2004

(30) Foreign Application Priority Data

Mar. 9, 2001  (FR) .................................. 01 03208

(51) Int. Cl.
*F16L 59/14*    (2006.01)

(52) U.S. Cl. ..................... 138/149; 138/108; 138/112; 138/113

(58) Field of Classification Search ................ 138/149, 138/114, 112, 113, 108
See application file for complete search history.

(56) References Cited

U.S. PATENT DOCUMENTS

| | | | | |
|---|---|---|---|---|
| 2,930,407 A | * | 3/1960 | Conley et al. | 138/114 |
| 3,250,297 A | * | 5/1966 | Mooneyham | 138/113 |
| 3,547,161 A | * | 12/1970 | Boyle et al. | 138/114 |
| 3,685,546 A | * | 8/1972 | Sigmund | 285/47 |
| 3,865,145 A | * | 2/1975 | McKay et al. | 138/113 |
| 3,952,777 A | * | 4/1976 | Uhlig | 138/149 |

(Continued)

FOREIGN PATENT DOCUMENTS

DE    25 18 940    11/1976

(Continued)

OTHER PUBLICATIONS

US 6,513,577, Feb. 2003, Baylot et al., 165/45, (withdrawn).*

*Primary Examiner*—Patrick Brinson
(74) *Attorney, Agent, or Firm*—Cohen, Pontani, Lieberman & Pavane

(57) ABSTRACT

The present invention concerns a device for heat-insulating at least one sub-marine pipe. The sub-marine pipe includes a heat insulation covering including a material subject to migration, the covering surrounding the pipe and being covered by a sealed protective envelope having a tubular shape and a longitudinal axis of symmetry. The envelope being constituted by a flexible or semi-rigid material able to remain in contact with the external surface of the insulation covering when the latter warps. The device includes at least two sealed transversal partitions, each being constituted by a closed rigid piece traversed by and integral with the pipe and with the envelope.

21 Claims, 9 Drawing Sheets

U.S. PATENT DOCUMENTS

| | | | | |
|---|---|---|---|---|
| 4,162,093 A | * | 7/1979 | Sigmund | 285/47 |
| 4,237,668 A | * | 12/1980 | Mathusima et al. | 52/249 |
| 4,921,018 A | | 5/1990 | Dridi et al. | 138/149 |
| 5,722,462 A | | 3/1998 | Dridi et al. | 138/149 |
| 5,979,506 A | * | 11/1999 | Aarseth | 138/33 |
| 6,213,157 B1 | * | 4/2001 | Thiebaud et al. | 138/149 |

FOREIGN PATENT DOCUMENTS

| | | |
|---|---|---|
| EP | 0 400 689 | 12/1990 |
| GB | 2 263 752 | 8/1993 |
| WO | WO 00/40886 | 7/2000 |

* cited by examiner

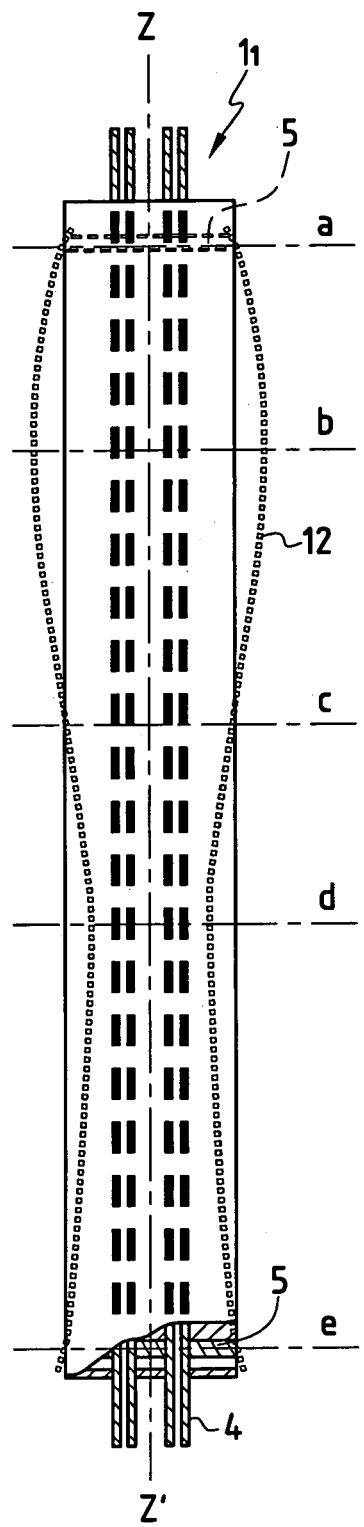
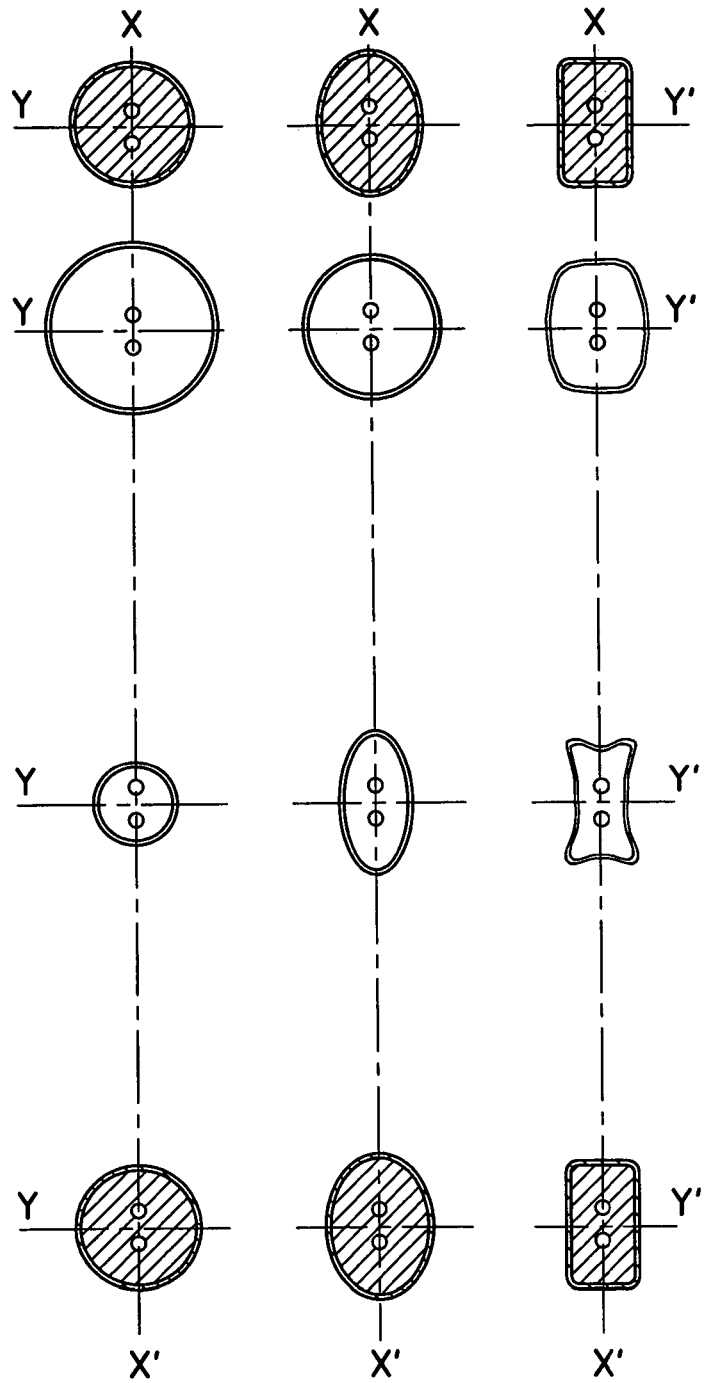
FIG.4　FIG.5　FIG.6　FIG.7

THERMAL INSULATION DEVICE FOR AT LEAST ONE UNDERWATER PIPE COMPRESSING SEALED PARTITIONS

PRIORITY CLAIM

This is a U.S. national stage of application No. PCT/FR02/00838, filed on 08 Mar. 2002. Priority is claimed on that application and on the following application(s): Country: France, Application No.: 01/02206, Filed: 09 Mar. 2001.

BACKGROUND OF THE INVENTION

1. Field of the Invention

The present invention concerns device and method for heat-insulating at least one sub-marine pipe situated at a great depth.

More particularly, it concerns the pipes connecting the bottom of the sea to anchored installations floating on the surface.

The technical sector of the invention is the field concerning the production and mounting of insulation systems outside and around pipes in which hot effluent circulates for which it is desired to limit heat losses.

2. Disscussion of the Related Art

This invention is more particularly applicable to the developments of deep sea petroleum fields, that is petroleum installations installed in the sea in which the surface equipment is generally situated on floating structures, the well heads being at the bottom of the sea. The pipes concerned by the present invention more particularly are risers or surface/bottom linking pipes rising to the surface, but also pipes connecting the well heads to said surface/bottom linking pipes.

Deep sea developments are carried out by water depths currently reaching 1500 m. Future developments are envisaged by water depths up to 3000–4000 m and beyond.

The main application of the invention concerns the heat insulation of sub-marine or sub-aquatic immersed pipes or ducts and situated more particularly at a depth of more than 300 meters and carrying hot petroleum products whose excessive cooling would cause problems during normal production and when production is stopped.

In fact, in these types of applications, many problems occur if the temperature of the petroleum products reduces by a significant value with respect to their production temperature which is often more than 60 to 80° C. when the temperature of the surrounding water at a great depth may be basically lower than 10° C. and reach 4° C. If the petroleum products cool below 30–60° C. for an initial temperature of between 70 and 80° C., the following is generally observed:

a high increase of viscosity which then reduces the flow of the pipe, a precipitation of dissolved paraffin which then increases the viscosity of the product and whose deposit can reduce the internal effective diameter of the pipe, the flocculation of asphaltenes bringing about the same problems, the sudden, compact and massive formation of gas hydrates which precipitate at high pressure and at a low temperature, thus suddenly blocking off the pipe.

Paraffins and asphaltenes remain stuck to the wall and then need to be cleaned by scraping the inside of the pipe. On the other hand, the hydrates are even more difficult and sometimes impossible to resorb.

The aim of the heat insulation of these pipes is therefore to delay cooling of the petroleum effluent carried, not only during established production mode so that their temperature is for example at least 40° C. when arriving on the surface for a production temperature at the inlet of the pipe of between 70 and 80° C., but also in cases of a reduction or even stoppage of production so as to ensure that the temperature of the effluent does not go below for example 30° C. so as to limit the problems mentioned above or at least enable them to be rendered reversible.

In the case of the installation of single pipes or bundles of pipes, said pipes are generally preferably prefabricated on shore in unit lengths of between 250 and 500 m which are then drawn from the open sea with the aid of a tow boat. In the case of a tower type bottom/surface link, the pipe length generally represents 50 to 95% of the water height, that is it can reach 2400 m for a water depth of 2500 m. When produced on shore, the first unit length is pulled from the sea and joined end-to-end to the next one, the tow boat keeping the unit in traction during the adding-on phase which may last several hours or even days. When the whole pipe or bundle of pipes has been placed in the water, the unit is pulled up to the site, generally on the subsurface approximately horizontal where it is then "canted", that is tilted into a vertical position, so as to reach the vertical position and then being placed into its final position.

A known insulation device exists having at least one sub-marine pipe (which may in fact be a single pipe or assembled with other pipes thus constituting bundles) to be placed on the bottom at a great depth and comprising an insulation external covering surrounding it and a protective envelope.

The insulation of the pipe(s) or pipe bundle commonly known as "bundles" is/are then protected by an external envelope having a double function:

firstly avoiding damage which may occur when producing or towing as in placing, especially in shallow water zones, said towing able in certain cases to be effected over distances ranging up to several hundreds of kilometers. To this effect, relatively resistant materials are used, such as steel, thermoplastic or duroplastic compounds or even a composite material;

secondly creating a sealed containment around the insulation system. This containment is required for external insulation coverings constituted by materials subject to migration including fluid compounds.

In effect, through sea bottoms of 2000 m, the hydrostatic pressure is about 200 bars, namely 20 megapascals, which requires that all the pipes and their insulation coverings need to be able to resist, not only these pressures without deteriorating during pressurisations and depressurisations of the pipe in which the hot fluid circulates, but also temperature cycles which generate volume variations of the various components and thus of positive or negative pressures possibly resulting in the partial or total destruction of the envelope, either by exceeding the admissible stresses or by this external envelope imploding (negative internal pressure variations).

The patents FR99/00985 and WO 00/40886 describe a method and device concerning a solid/liquid phase change and melting latent heat insulation material able to restore calories in the internal pipe and confined inside a sealed ductile envelope which makes it able to follow the expansion and contraction of the various components under the influence of all the environment parameters, including the internal and external temperatures. Thus, the pipe is confined inside a flexible thermoplastic envelope, possibly circular, made in particular of polyethylene or polypropylene, the increase or reduction of the internal volume due to the temperature variations and comparable to respiration being absorbed by the flexibility of the envelope constituted, for example, by a thermoplastic material having a large elastic limit. So as to resist the mechanical stresses, a semi-rigid envelope is preferably used constituted by a resistant material such as steel or a composite material, such as a compound embodied from a binder such as an epoxy resin and mineral or organic fibres such as glass or carbon fibres, but the bundle here is given an ovoid or flattened shape with or without any counter curve which on a constant perimeter provides it with a section smaller than the corresponding circle. Thus, the "respiration" of the bundle shall result, in the case of an increase and reduction of the volume in respectively a "recircling" of the envelope or an accentuation of flattening of the envelope. In this case, the bundle/envelope unit is denoted by the term "flat bundle", as opposed to a circular envelope.

There is also the method used on the GANET field which consists of prefabricating onshore a sealed circular bundle having no insulating complex but filled with an inert gas and then of towing it onto the site and installing it at great depth so as to finally fill it with a mono-ethylene glycol-based insulating compound added with viscous-rendering agents. So as to absorb the volume variations created by the temperature variations without creating unacceptable stresses inside the circular steel envelope, a ductile pipe pressurised with nitrogen has been installed inside the bundle along the latter.

These prior embodiments have been described for applications in which the pipe rests horizontally on the bottom of the sea In the case of a bottom/surface link, for example the vertical portion of a tower or even the small chain section connecting the top of the tower to the surface support or even pipes resting on a steep slope of the bottom of the sea, the external pressure varies along the pipe and gradually decreases when it is brought back up to the surface. In the case of fluid or pasty insulating materials, when this bottom has a density less than that of the water of the sea, generally a density of between 0.8 and 0.85, the differential pressure between the outside and the inside shall vary along said pipe and gradually increasing when it is lifted up to the surface. Thus, this results in deformations accentuated in those portions exhibiting the differential pressure maximum, thus inducing significant transfers of fluid parallel to the longitudinal axis of said pipe. In addition, the transfers are amplified by "breathing" phenomena due to the temperature variations described above.

A "flat bundle" is sensitive to the pressure variations due to the slopes: excess pressure at the bottom, depression at the top, and the pulling phase is critical as the length, possibly reaching several kilometers, the bundle is never made to be perfectly horizontal and this results in significant differential pressure variations during towing and particularly during the canting operation.

When the bundle is in the vertical position or at the bottom of the sea on a steep slope, the pressure differential created by the low density of the insulating material associated with the volume variation created by the heat expansion of the insulation material generates movements of the insulating material the external envelope needs to be able to support. Thus, efforts are sought to avoid the movements of particles parallel to the axis of the bundle, that is migrations of the insulation material between two distant zones of the bundle as they risk destroying the actual structure of the insulating material.

So that the bundle behaves properly throughout its stay at sea, it is desirable that it does not comprise any residual gas. In fact, in the case of a semi-fluid or pasty insulating complex, any pocket of gas resulting from the production process shall have repercussions, firstly concerning transport as, the moment the bundle is moved to a significant depth, the ambient pressure compresses the residual gas which risks significantly reducing buoyancy, this possibly leading to dangerous situations, not only for the materials but also for personnel; and secondly, during vertical positioning, all the compressed gas pockets move to the top of the bundle, thus risking creating a significant pipe length without any insulating component.

OBJECTS AND SUMMARY OF THE INVENTION

The object of the present invention is to be able to produce at the best possible cost a "bundle" onshore, of being able to place a covering made of a pasty or semi-fluid insulating material, of towing it to the subsurface, of canting it into a vertical position so as to install it whilst observing the completeness of the unit until its is put into production and throughout its period of life which generally is more than 30 years.

A further object is to be able to embody the insulation of at least one sub-marine pipe to be laid on the sea bottom at great depth and in particular in zones with steep slopes from a sealed "flat bundle" type envelope able to provide significant transversal flexibility so as to absorb volume variations whilst retaining sufficient longitudinal rigidity so as to authorise handlings, such as onshore preproduction, towing to the site and the preservation of the mechanical integrity of said envelope throughout the period of life of the product which reaches and exceeds 30 years.

The problem to be resolved is to minimise the longitudinal migrations of the insulation materials subject to migration which is particularly significant when said insulating material is a semi-fluid or pasty, especially of the jellified insulation matrix type, owing to the risks of deteriorations of the performances of the insulation complex the moment inappropriate internal shearings are applied to said insulation matrix.

To reach this aim, the present invention concerns a heat insulation device having at last one sub-marine pipe comprising:

a heat insulation covering surrounding said pipe(s), said covering being covered with a sealed protective envelope, and said insulation covering including a material subject to migration and said envelope being constituted by a flexible or semi-rigid material able to remain in contact with the outer surface of said insulation covering when the latter warps, said envelope has a tubular shape and having a central longitudinal axis ZZ' and preferably the transversal section of said envelope defining a perimeter having two axes of symmetry XX' and YY' perpendicular to each other and to said longitudinal axis ZZ'.

According to a first main characteristic, the device of the invention is characterised in that it includes at least two sealed transversal partitions each being constituted by a closed rigid structure traversed by said pipe(s) and integral with the latter and at its periphery with said envelope.

This rigid structure integral with the envelope prevents the movement of said envelope opposite said partition and with respect to the latter and thus fixes the geometry of the cross section of the envelope at the level of said partition.

The terms "sealed" and "closed" is understood to mean that said partition does not allow the material constituting said insulation covering to pass through said partition and in particular that the joining point between said pipe and the orifices through which said pipe traverses said partition prohibits the passage of said material of the insulation covering.

The sealed partitions ensure the containment of the insulating material constituting said insulation covering between said envelope and said partitions.

The term "cross section" is understood to be the section inside a plane XX', YY' perpendicular to said longitudinal axis ZZ' of said envelope.

In a particular embodiment, said closed structure of said sealed transversal partition includes a cylindrical piece having a cross section whose perimeter has the same fixed shape as that of said cross section of the envelope.

The term "perimeter of the cross section" is understood in the present description to be the closed curve-shaped line which delimits the flat surface defined by said cross section.

The perimeter of the cross section of the envelope at the level of the sealed partitions has a fixed shape and is thus unable to warp via contraction or expansion of said envelope at this level.

According to various embodiment variants, said cross section of the envelope has a circular or oval or even rectangular shape and preferably with rounded angles.

Where the device comprises at least two pipes arranged along a given plane, the cross section of said envelope has preferably an elongated shape in the same direction as this plane.

More particularly, the external perimeter of the cross section of said protective envelope is a closed curve whose ratio of the square and length on the surface it delimits is at least equal to 13, as described in FR99/00985.

During internal volume variations, the envelope shall tend to warp into having a circular shape which mathematically constitutes the shape having at a constant perimeter the largest surface.

In the case of a sealed envelope with a circular profile, a volume increase generates stresses in the wall which are linked to the pressure increase resulting from this volume increase.

On the other hand, if the shape of the cross section of the external covering is flattened, the better is the capacity of its envelope to absorb the expansions due to the dilation of the various components under the effect of the temperature without creating any significant excess pressure as the envelope then is able to be rounded.

In the case of a profile with an oval shape, an internal pressure variation shall involve a combination of bending and pure traction stresses as the variable curve of the oval then behaves as an architectural arch with, however, the difference that in the case of our envelope, the stresses are traction stresses and not compression stresses. Thus, an oval shape or one approaching an oval shall be able to be envisaged for low expansion capacities and it shall be appropriate to then consider ovals with a length ratio of the major axis pmax to that of the minor axis pmin as high as possible, such as at least 2/1 or 3/1.

Then the shape of the envelope shall be selected according to the overall expansion of the volume of the external insulation covering under the effect of temperature variations. Thus, for an insulation system mainly using materials subject to expansion a rectangular, polygonal or even oval shape allows an expansion via bending of the wall whilst inducing a minimum of traction stresses in the external envelope.

For an insulation material possessing large expansion under the effect of temperature variations, such as gas oil, products of the family of alcanes (paraffins) or even phase change materials, the rectangle shall advantageously be flattened so as to create the necessary expansion reserve. It is possible to further increase this expansion reserve by creating by known means counter-curves.

"Insulating material" is understood here to be a material preferably having a heat conductivity of less than 0.5 W×m×K and preferably between 0.05 and 0.2 W×m×K. K (Watt/meter/Kelvin).

The term "material subject to migration" is understood to be a liquid, pasty or solid consistency material, such as the consistency of a grease, paraffin or gel able to be deformed by the stresses resulting from differential pressures between two separate points of the envelope and/or temperature variations inside said insulation material.

There exist various heat insulation materials able to constitute insulation coverings according to the invention.

Most frequently, this involves insulation complexes including a first compound, such as a hydrocarbonated compound like paraffin or gas oil, and preferably mixed with a second gelling compound and/or with a structuring effect, especially by means of reticulation, such as a second compound of the polyurethane type.

As first compounds, it is possible to cite more particularly the chemical compounds of the family of alcanes, such as paraffins or waxes, bitumen, tars, thick alcohols, glycols and more particularly even compounds whose temperature for melting materials is between the temperature $t_1$ of the hot effluent circulating in one of the pipes and the temperature $t_2$ of the surrounding medium of the pipe in operation, namely in fact generally speaking a melting temperature between 20 and 80° C. As a paraffin for example, tetracosane is used having the formula $C_{24}H_{50}$ having a melting temperature of about 50° C.

Said partitions create heat bridges. Thus, it is necessary to space the partitions as much as possible so as to reduce the heat bridges.

In a particular embodiment, the spacing between two successive sealed partitions along said longitudinal axis ZZ' of said envelope is between 50 and 200 meters and in particular between 100 and 150 meters.

So as to reduce the number of sealed partitions, according to one preferential characteristic, a device according to the invention includes at least and preferably a plurality of cooling jig(s) disposed transversally to said longitudinal axis (ZZ') constituted by an open rigid structure integral with said pipe(s) and traversed by the latter and integral with said envelope at its periphery and placed between said two successive sealed partitions preferably at regular intervals along said longitudinal axis ZZ', said cooling jig preferably having openings allowing the passage of the material constituting said insulation covering through said cooling jig.

Like said sealed partition, said cooling jig fixes the shape of the cross section of the envelope at the level of said cooling jig whilst at the same time minimising the heat bridges.

More particularly, said open structure of said cooling jig includes a cylindrical piece having a cross section whose perimeter is inscribed in a geometrical figure identical to the geometrical figure defined by the shape of the perimeter of the cross section of said sealed partition.

A device of invention preferably comprises a plurality of cooling jigs placed along said longitudinal axis ZZ' of the envelope and preferably at regular intervals, two successive cooling jigs being spaced preferably between 5 and 50 meters and better still between 5 and 20 meters.

According to a second main characteristic of the present invention, the device includes at least one centralising jig and preferably a plurality of centralising jigs placed transversally to said longitudinal axis ZZ' at regular intervals between two said successive sealed partitions and/or between said two cooling jigs along said longitudinal axis ZZ', each centralising jig being constituted by a rigid piece integral with said pipe(s) and having a shape permitting a limited movement of said envelope on contraction and on expansion with respect to said centralising jig, said rigid piece of the centralising jig having an external surface, preferably a cylindrical external surface in which the perimeter of the cross section stands back with respect to that of said sealed partition and limits the warpings of said envelope by a mechanical stop on at least two opposing points of the perimeter of the cross section of said envelope.

This centralising jig is used to ensure a minimum coating of the insulation covering (3) around said pipe(s) in cases of warping via contraction of the envelope and transfer of said material able to flow between said two sealed partitions and/or between said two cooling jigs.

More particularly, said centralising jig has a cross section whose perimeter is inscribed inside a geometrical figure which is approximately homothetic with respect to the geometrical figure defined by the perimeter of the cross section of said sealed partition.

In one embodiment, said rigid piece constituting said centralising jig has one portion of its external surface sufficiently standing back with respect to the surface of the envelope and/or has perforations traversing it so as to create a space allowing the transfer of the material constituting said insulation covering through said centralising jig.

The distance between two centralising jigs along said longitudinal axis ZZ' is such that it makes it possible to ensure retaining a quantity of material constituting said insulation covering sufficient to ensure the minimum coating required for the heat insulation of said pipe, having regard to the deformations on contraction supported by said envelope.

Advantageously, the device of the invention comprises a plurality of centralising jigs and two successive centralising jigs are spaced along said longitudinal axis ZZ' of the envelope by a distance of between 2 and 5 meters.

The present invention more particularly concerns a device including at least two sub-marine pipes placed in parallel.

In this case, said sealed partitions of the cooling jig and centralising jig advantageously keep at least said two sub-marine pipes at a fixed distance from each other.

The present invention also concerns a unit heat insulation device for obtaining a device according to the invention by assembling end to end said unit heat insulation devices and is characterised in that it includes:
  one or all of the unit elements of the sub-marine pipe instead of the sub-marine pipes, and
  an insulation covering and said protective envelope as defined above, each said unit element including, from at least one of its extremities or at each of its extremities said sealed partition and preferably from said centralising jigs and again preferably from the cooling jigs as defined above arranged between two successive sealed partitions.

Finally, the present invention concerns a method for heat insulating at least one sub-marine pipe characterised in that unit heat insulation devices described above are embodied and are assembled end to end as described above.

In one preferred embodiment, said insulation material is a complex including various components which are mixed and then injected in a liquid state into various compartments delimited by said two successive sealed partitions and said insulation material is transformed into a gel by the reticulation of at least one of its components.

This type of jellified matrix is able to limit convection.

BRIEF DESCRIPTION OF THE DRAWINGS

Other characteristics and advantages of the present invention shall appear more readily from a reading of the following description given by way of non-restrictive illustration with reference to the accompanying drawings on which:

FIG. 4 is a side view of a device according to the invention in the case of an application in a rising column.

FIGS. 5, 6 and 7 are cutaway views showing the cross section of the device at the level a-b-d and e of FIG. 4 respectively for each of the types of devices with a circular envelope (FIG. 5), oval envelope (FIG. 6) and a rectangular envelope with rounded edges (FIG. 7).

FIGS. 8, 9 and 10 represent the section of the external steel envelope of a bundle, respectively its circular shape following production (FIG. 8), then deformed beyond the elastic limit with the press under a force F and finally in a slightly flattened shape after releasing the force F (FIG. 9) which then constitutes the external envelope of a "flat bundle" having an approximately oval section (FIG. 10).

DETAILED DESCRIPTION OF THE PRESENTLY PREFERRED EMBODIMENTS

Figure 1:
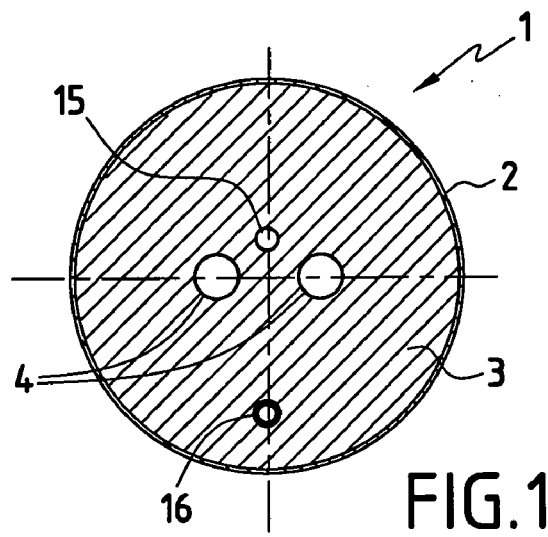
FIGS. 1, 2 and 3 are cutaway views of a cross section of a bundle in which the cross section of the envelope has a circular shape (FIG. 1), rectangular with rounded edges (FIG. 2) and oval (FIG. 3).

FIG. 1 is the cutaway view of the cross section of a device according to the invention, and is composed of a flexible circular external envelope 2 made of a thermoplastic material containing an insulation material 3 subject to migration, for example a pasty paraffin type material, at the centre of which are placed two petroleum effluent production pipes 4, as well as an auxiliary heating pipe 15 and an electric cable 16.

Figure 2:
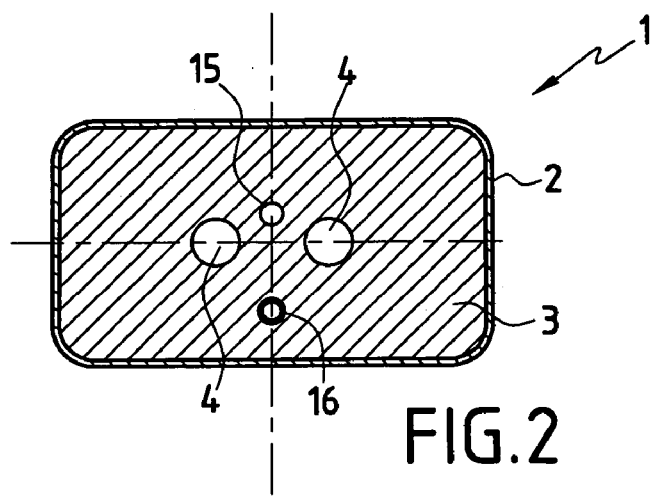
Figure 3:
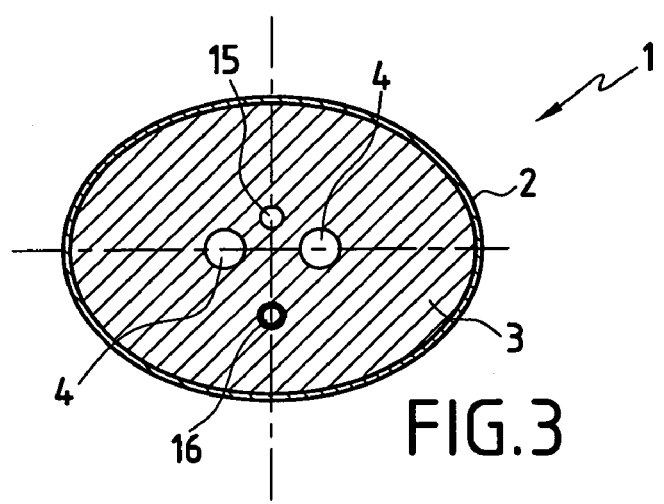
Figure 8:
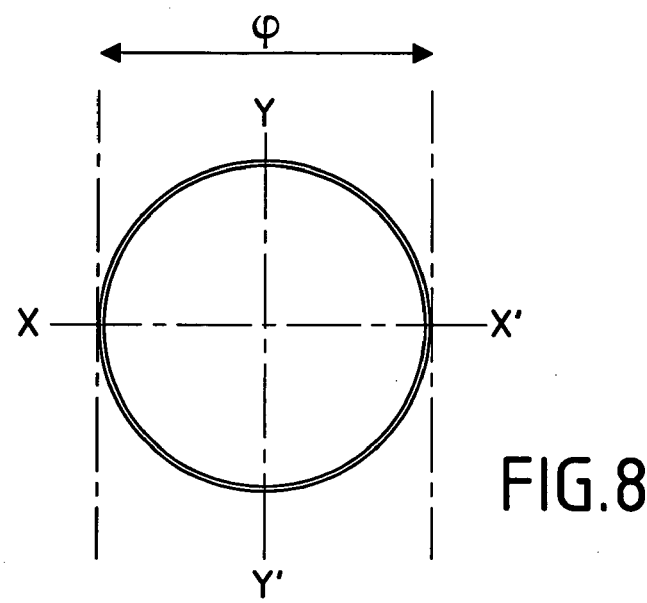
FIGS. 8, 9 and 10 represent the various states for obtaining a device with an oval envelope (FIG. 10) from a device with a circular envelope (FIG. 8) by embodying warping beyond the elastic limit (FIG. 9).
Figure 9:
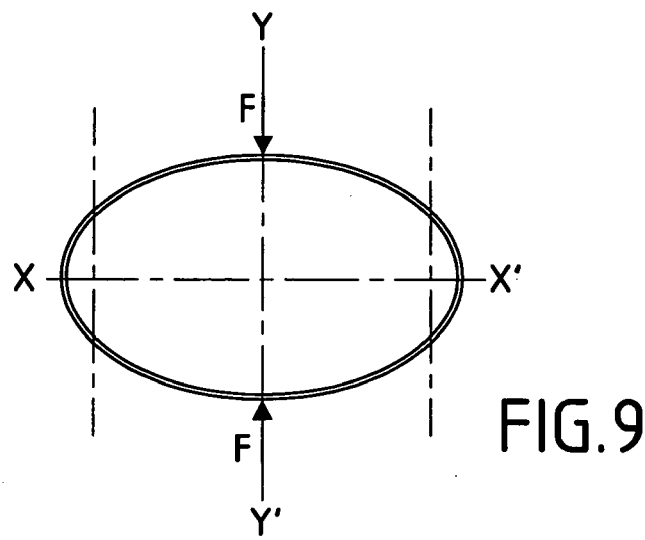
Figure 10:
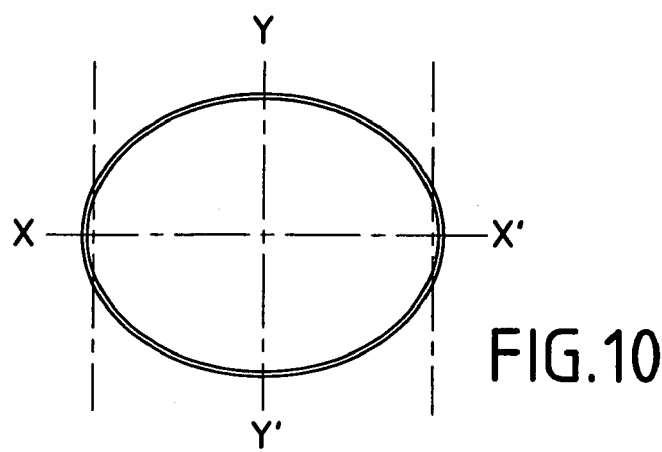
Figure 11:
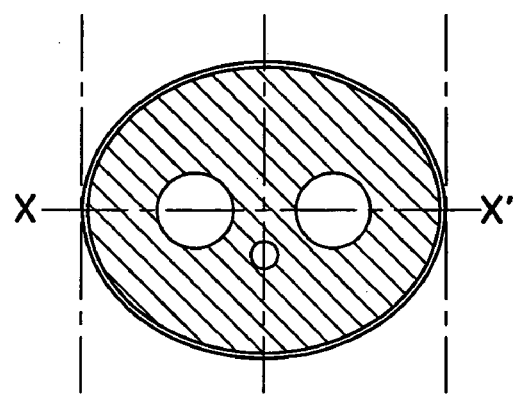
FIGS. 11, 12 and 13 are cutaway views of a cross section of a device with an oval envelope at the level of a sealed partition (FIG. 11) and at the level of a centralising jig (FIGS. 12 and 13), said envelope being in a contraction phase (FIG. 12) and in an expansion phase (FIG. 13).
Figure 12:
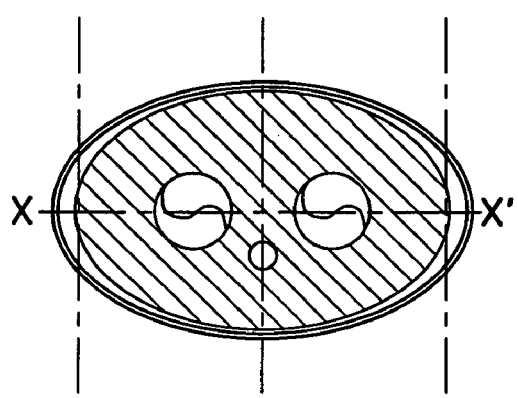
Figure 13:
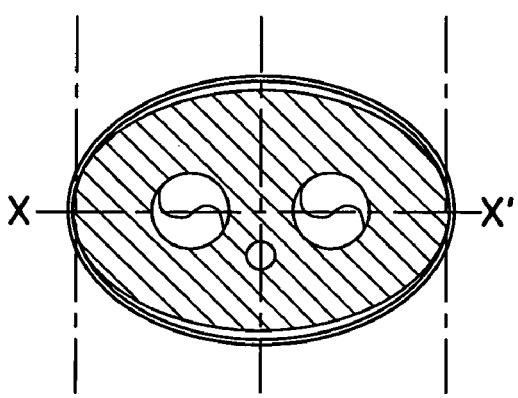

In FIGS. 2 and 3, the same pipes 4 and 15 and cables 16 are placed inside a flat bundle made of sheet steel or a composite material, the external envelope 2 respectively having the shape of a rectangle with rounded edges (FIG. 2) or approximately the shape of an ellipse (FIG. 3).

FIG. 4 is a front view of a thermically insulated rising column portion or "riser" 1 comprising an external envelope 2 made of either a thermoplastic material or of steel or even of a composite material whose section can be circular as shown in detail on FIG. 5 or elliptic as shown in detail on FIG. 6 or even rectangular with rounded edges as shown in detail on FIG. 7.

Said riser 1 comprises two pipes 4 installed at the centre, as well as a sealed partition 5 at the upper portion (a) and lower portion (b) used to contain in cooperation with the external envelope 2 the insulating material 3. Said sealed partition 5 supports said pipes 4 and keeps them away from each other by a fixed distance and from the wall.

All the figures show a heat insulation device with two sub-marine pipes comprising a heat insulation device with at least one sub-marine pipe comprising:

an insulation covering surrounding said pipe(s), said covering being covered with a protective envelope, and said envelope having a tubular shape and a longitudinal axis of symmetry ZZ', the cross section of said envelope defining a perimeter having two axes of symmetry XX' and YY' perpendicular to each other and to said longitudinal axis ZZ'.

Figure 14:
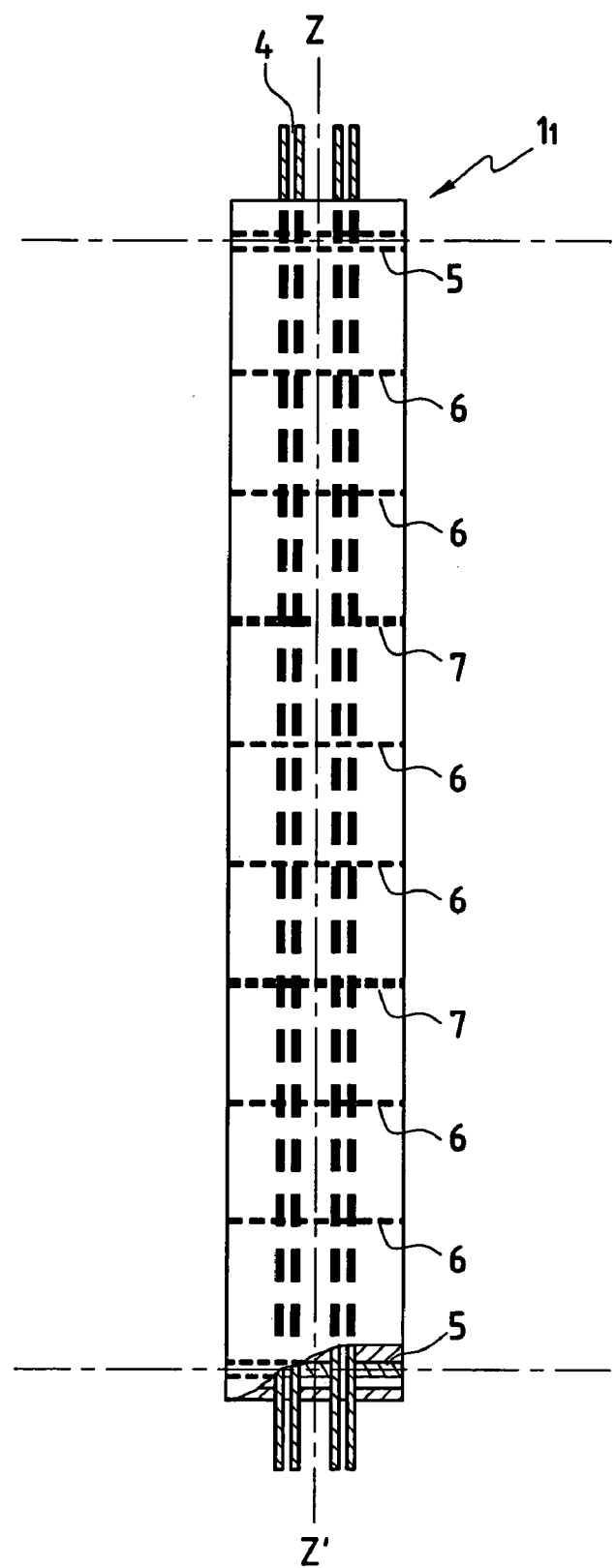
FIG. 14 is a side view of a device according to the invention having several centralising jig and cooling jig sealed partitions.
Figure 20:
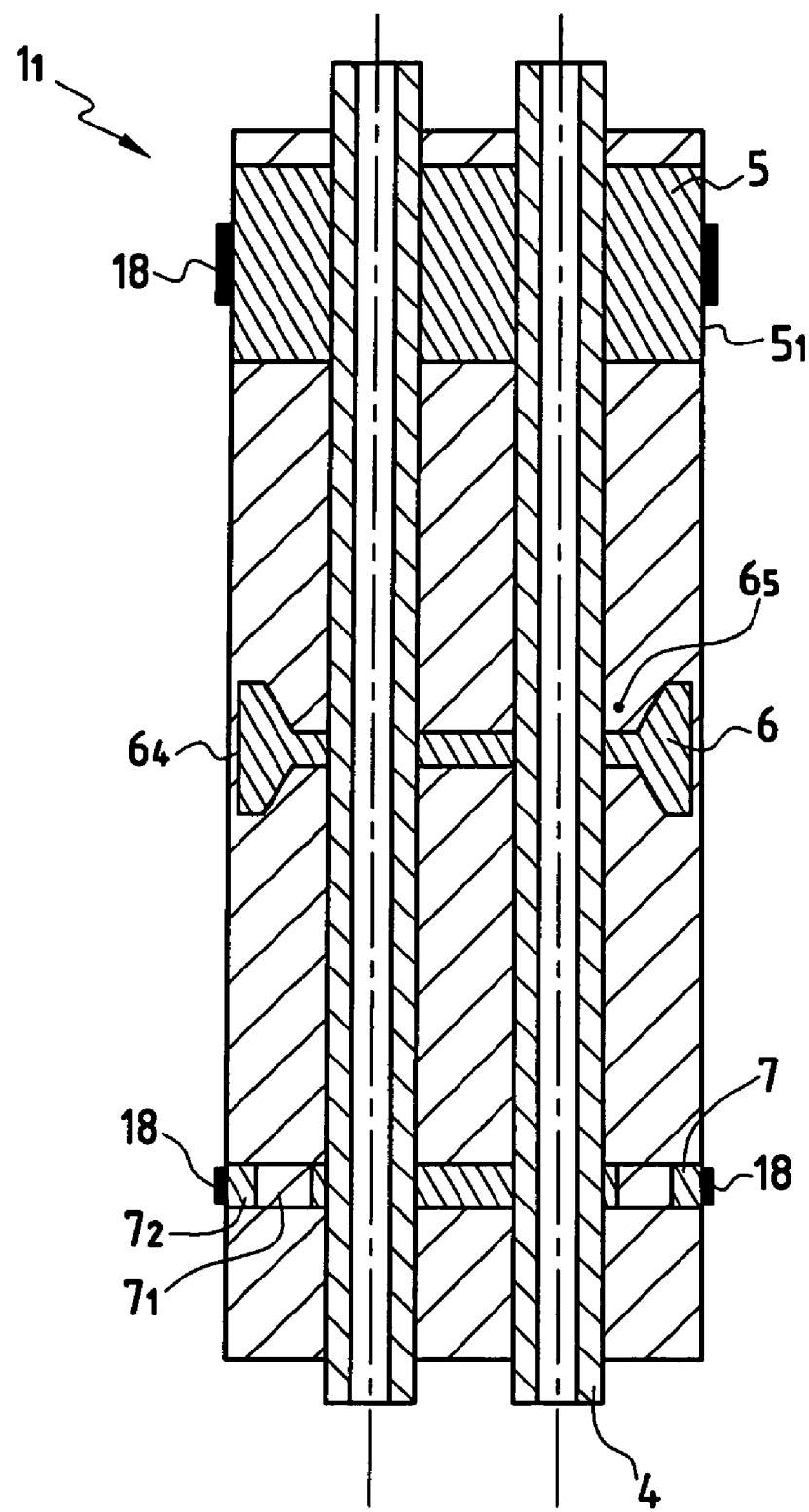
FIG. 20 is a longitudinal cutaway view of a device according to the invention having a sealed partition, a centralising jig and a cooling jig.

FIGS. 4 and 14 show a portion or section of a heat insulation device 1 designated above as a unit heat insulation device which includes two sealed partitions 5 and a plurality of centralising jigs 6 or cooling jigs 7. The sealed partitions 5, centralising jigs 6 and cooling jigs 7 are rigid pieces having a cylindrical shape, as shown on FIG. 20.

On FIGS. 5, 6, 7 and 11, the rigid piece constituting the sealed partition has a cross section having the same shape as that of the cross section of the envelope. On FIG. 20, the height of the cylindrical rigid piece constituting the sealed partition 5 is at least one quarter and preferably about half its diameter so that the contact surface 5, together with the envelope by which the sealed partition is rendered integral with the envelope, is sufficiently large. The sealed partition 5 is traversed by the pipes 4. The link between the sealed partition and the pipes 4 is also sealed which renders possible containment without any leaks occurring inside the envelope of the insulation material. The sealed partition 5 has mechanical resistance to enable it to fix the section of the external envelope to this level (levels a and d, FIG. 4). The external cylindrical surface $5_1$ of the rigid piece constituting the sealed partition 5 is glued or welded to the envelope, but advantageously it can also be as a complement encircled by an external circling strip 18 outside the envelope at this level.

Said sealed partitions are structures separate from said envelope having a continuity in a longitudinal direction between two points situated on both sides of said partition.

Placed inside the confined space between two sealed partitions 5 of said section $1_1$ are firstly centralising jigs 6 and secondly cooling jigs 7.

The centralising jigs are preferably placed at regular intervals, for example by a distance of between 2 and 5 meters. They are also composed of a rigid piece integral with the internal pipes 4, the shape of the centralising jigs permitting a limited movement of the envelope 2 on contraction and on expansion opposite said centralising jig 6. More particularly, said movement of the envelope 2 opposite said centralising jig 6 represents a variation of between 0.1 and 10% and preferably between 0.1 and 5% of the distance between two opposing points $2_1$–$2_2$, $2_3$–$2_4$ of the perimeter of the cross section of said envelope.

Figure 15:
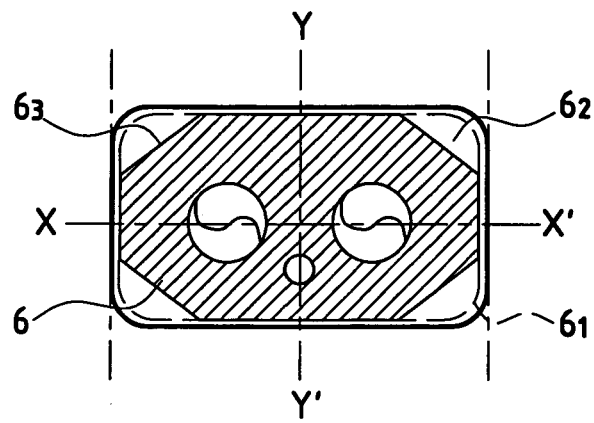
FIGS. 15, 16 and 17 represent a cutaway view of a cross section of a device according to the invention including a rectangular envelope with rounded angles at the level of a centralising jig respectively in an idle position (FIG. 15), in the expansion configuration of the envelope (FIG. 16) and in the contraction configuration of the envelope (FIG. 17).
Figure 16:
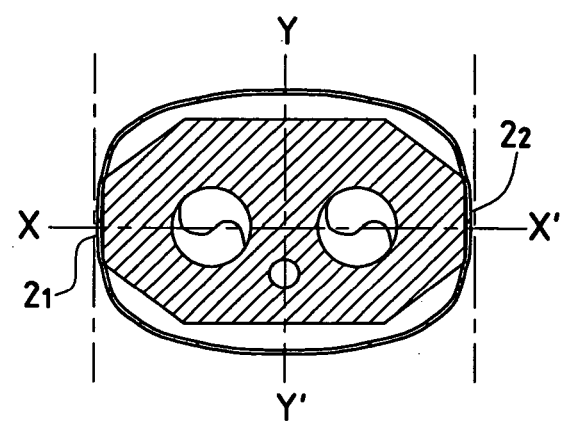
Figure 17:
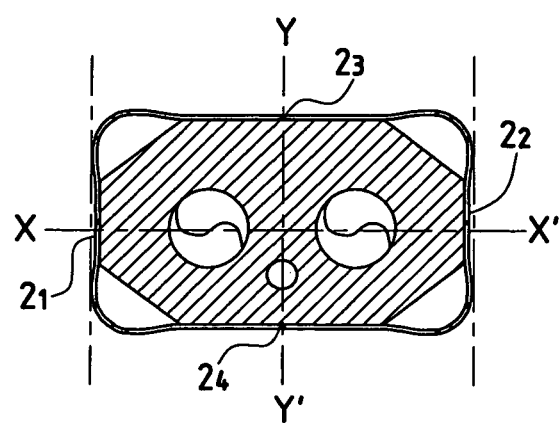

On FIGS. 15 to 17, said cross section of said centralising jig 6 has the shape of a rectangle whose angles are truncated into bevels $9_1$.

On FIGS. 12 and 13 and 15 to 17, the centralising jig has a cross section whose perimeter is inscribed inside a first geometrical figure $6_1$ having the shape of a rectangle with rounded edges (FIG. 15), oval shape (FIG. 12) which is homothetic with respect to the geometrical figure defined by the perimeter of the cross section of the sealed partition with which it cooperates.

On FIGS. 16 and 17, these show that the perimeter of the cross section of the centralising jig 6 stands back with respect to that of the sealed partition and thus of the envelope in idle position (FIG. 11) and limits the deformations (FIGS. 16 and 17) of said envelope via a direct mechanical stop of the latter on at least two opposing points $2_1$–$2_2$, $2_3$–$2_4$ of the perimeter of the cross section of said envelope.

In the event of excess pressure inside the envelope with respect to the outside (see zone b FIGS. 4 and 16), if the envelope 2 is not circular and has a flattened shape, especially oval or rectangular with a major axis of symmetry XX' and a minor axis of symmetry YY' perpendicular to each other and situated inside the cross section plane, the perimeter of the cross section of the envelope tends to be circularised. In these circumstances, the mechanical stop and thus the contact of the envelope with said centralising jig is then made only at opposing points $2_1$–$2_2$ of said envelope situated on the largest major axis of symmetry XX' so that the expansion of said envelope along the minor axis of symmetry XX' is also limited (see zone b of FIGS. 4 and 16) and the cross section of said envelope can thus stay with a flattened shape (not-circular).

On the other hand, in the case of excess pressure of the outside of the envelope with respect to the inside of the envelope, the mechanical stop and the contact of the envelope with said centralising jig is made both at opposing points $2_1$–$2_2$ of said envelope situated on the largest major axis of symmetry XX' and at opposing points $2_3$–$2_4$ of said envelope situated on the smallest minor axis of symmetry YY' inside the cross section plane so that the contraction of said envelope is limited (see zone d of FIGS. 4 and 17). Thus, any possible implosion of the envelope is avoided at these points.

The centralising jig 6 advantageously has at its periphery, mainly in the zones in contact with the envelope, a sufficiently wide contact surface $6_4$ so as to avoid damaging the external envelope 2 when the bundle "breathes". On the other hand, the central portion of the centralising jig can be hollowed $6_5$, as shown on FIG. 20, so as to minimise the heat points whilst sufficiently retaining enough material to preserve the centralising jig with sufficient rigidity.

The cooling jigs 7 are thinner cylindrical rigid pieces, their function, like the sealed partitions 5, being to fix the shape of the cross section of the envelope at their level, this section preferably being identical to the one imposed by the sealed partition 5. The contact surface $7_2$ of the peripheral section of the cylinder constituting the piece thus, as shown on FIG. 20 has a height smaller than those of the centralising jigs or sealed partitions so as to minimise the heat points, but like the sealed partitions, they are rendered integral with the envelope by glueing or welding and preferably by tying up ($7_2$) with a tying up strip outside the envelope 18.

The cooling jig 7 is not sealed as it comprises openings $7_1$ which allow the insulating material to pass, especially during the insulation material filling phase, said material being fluid or pasty and preferably having an extremely low viscosity. The cooling jig 7 is integral with the internal pipes 4 and keeps them at a fixed distance from each other like the sealed partitions 5 and the centralising jigs 6. The cooling jig also keeps the internal pipes at fixed distances from the envelope at the level of the cooling jig.

The successive cooling jigs are preferably spaced by a distance of between, 5 and 50 meters and better between 5 and 20 meters, the external surface of said rigid cylindrical pieces constituting said sealed partition 5 or said cooling jig 7 being in continuous contact with said envelope 2. The expression "continuous contact" needs to be understood that said contact is embodied on the entire circumference of the perimeter of the cross section of said envelope.

FIGS. 5, 6 and 7 show at each of the levels a, b, d and e respectively, for each of the circular, oval or rectangular envelopes and considerably amplified, deformations generated by the differential pressure between the inside of the device and the ambient environment between two sealed partitions respectively localised at the levels a and e. The differential pressure exerted on the envelope 2 is due to the difference of density of the insulation material with respect to the sea water, said density generally being approximately between 0.8 and 0.85. Thus, by way of illustration, if a riser portion 11 is considered as 100 m for an insulation material with a density 0.8, the differential pressure between the top and the bottom shall be 0.2 Mpa, the low portion (level d, FIG. 4) of said riser being in depression whereas the top portion shall be in excess pressure. This shall result in a warping 12 of the external envelope 2 whose result is approximately comparable in each of the configurations according to FIGS. 5, 6 and 7. The depression at the bottom portion shall tend to contract the envelope, as illustrated between the plane e and the plane d where the section is minimum, so as to then increase towards a maximum at b and then decrease towards the nominal section imposed by the membrane 11. Depending on the bundle type, the deformations are shown in the planes a-b-c-d-e relating to FIGS. 5, 6 and 7.

These warpings of the external envelope shall generate transfers towards the top of the semi-fluid or pasty insulation complex which risks harming the proper behaviour of the insulating material or even destroy it as this type of insulation material subject to migration remains fragile and is ill-adapted to withstand internal shearings created by the internal migrations.

In the case of FIG. 5 showing the circular envelope made of thermoplastic material, the expansion at b is significant, but the contraction observed at d remains extremely small as the existing depression has fewer repercussions on the final shape.

Added to this phenomenon of transferring fluid upwards is the phenomenon of breathing as described previously, this phenomenon being due to the temperature variations of the internal pipes which generate volume variations mainly inside the insulation complex which amplify warpings, especially in the top portion.

When a transfer of the material of said insulation covering occurs by migration in said longitudinal direction ZZ' and generally from the bottom to the top in a case where said pipe is a riser or is sloping, the shape of the perimeter of the cross section of said envelope is not uniform along the longitudinal axis of symmetry ZZ' and said fixed shape of the perimeter of the cross section of said sealed partition then corresponds to the shape of the cross section of said envelope before said transfer of material, that is when said insulation covering is uniformly distributed around said pipe along said longitudinal axis ZZ' and when said shape of the cross section of the envelope along said longitudinal axis is also uniform.

When deformations of the envelope and the shape of the external surface of the insulation covering occur, the shape of the perimeter of said cross section of the envelope generally remains symmetrical with respect to said two axes XX', YY' perpendicular to each other and to said longitudinal axis of symmetry ZZ' of the envelope.

In one preferred embodiment, the centralising jigs and cooling jigs are advantageously embodied similarly to a bicycle wheel as shown on FIGS. 21–24. Said jig is constituted by a wheel rim, a hub and spokes embodied preferably continuously as a filament winding.

A filament winding is understood to be a product obtained from a resistant fibre, preferably a carbon or glass fibre impregnated with a composite product, such as epoxy resin, and preferably placed continuously tensed before the resin is reticulated.

Said wheel rim and said hub are preferably produced continuously from a flat steel strip.

Figure 21:
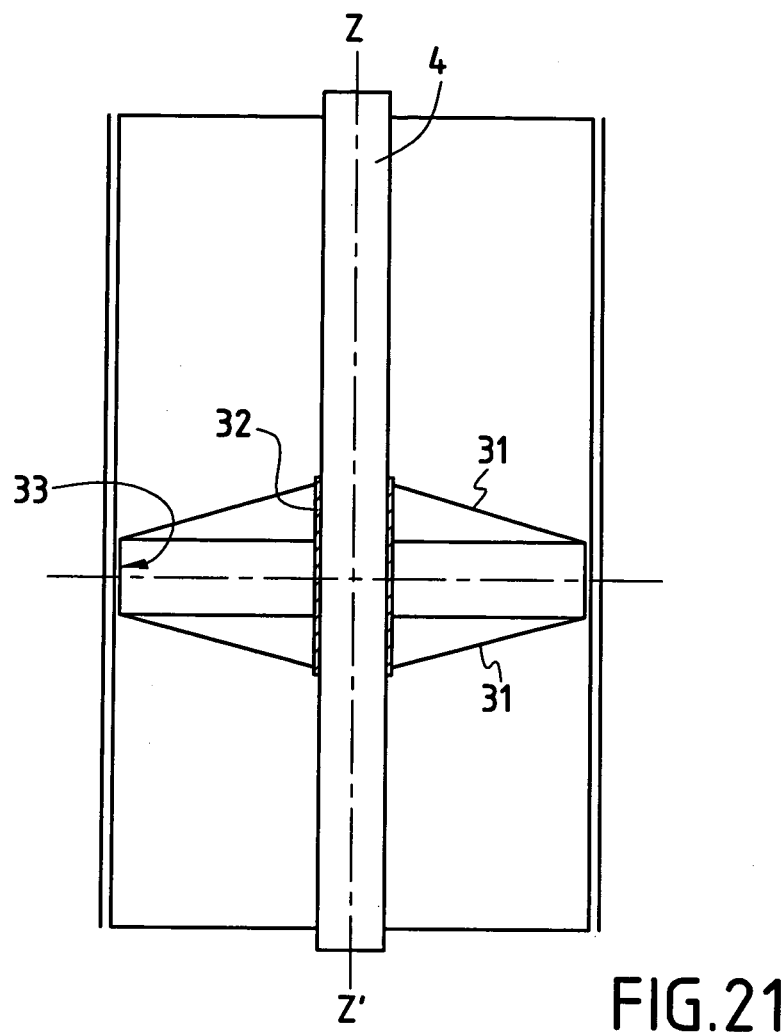
FIGS. 21 and 22 respectively represent a longitudinal cutaway view (FIG. 21) and top view (FIG. 22) of a centralising or cooling jig including a rigid piece with a bicycle type open structure with spokes.
Figure 22:
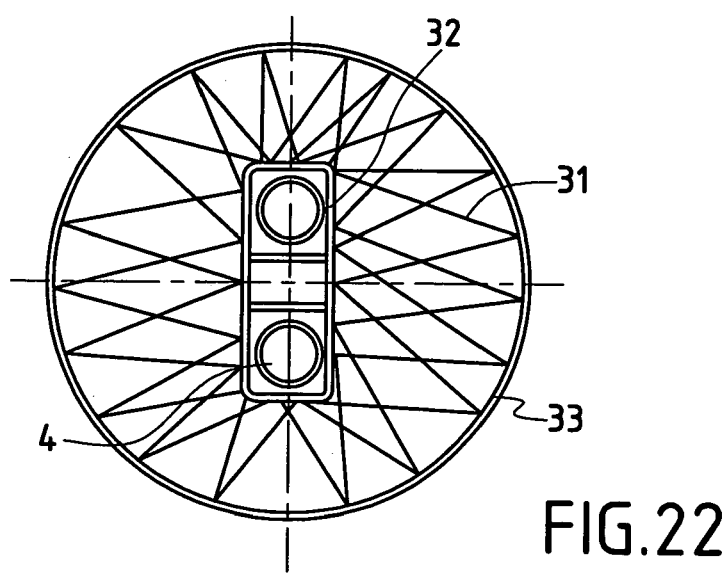

Production is made from a wider strip and is folded depending on the shape, such as rectangular, shown on FIG. 21. Additional stiffeners (not shown) are advantageously added to provide the unit with great rigidity. The wheel rim 33 and its hub 32 are positioned with respect to each other with the aid of a temporary device (not shown) and the composite strip impregnated with resin and kept in tension is successively passed around a hooking element of the wheel rim and then an element for hooking the hub, and so on so as to constitute the interlocking of spokes which shall constitute the resistant linking between said wheel rim and said hub. It shall be noted that the mechanical operating mode is similar to that of a bicycle wheel as, under a vertical load, the wheel rim works on compression, but all the spokes work on tension. The technique for producing a composite strip impregnated with resin is known under the term of "pulltrusion" which signifies "traction/extrusion" and shall advantageously be associated with a handling robot which shall automatically carry out "knitting" around the support hooking elements of the wheel rim and the hub so as to constitute the spokes.

The cooling/centralising jig has been shown in a circular form, but its shape can also be approximately oval or rectangular with rounded edges, but in this case the distribution of the spokes shall no longer be uniform, certain zones needing to be strengthened so as to have sufficient resistance in all directions.

Figure 18:
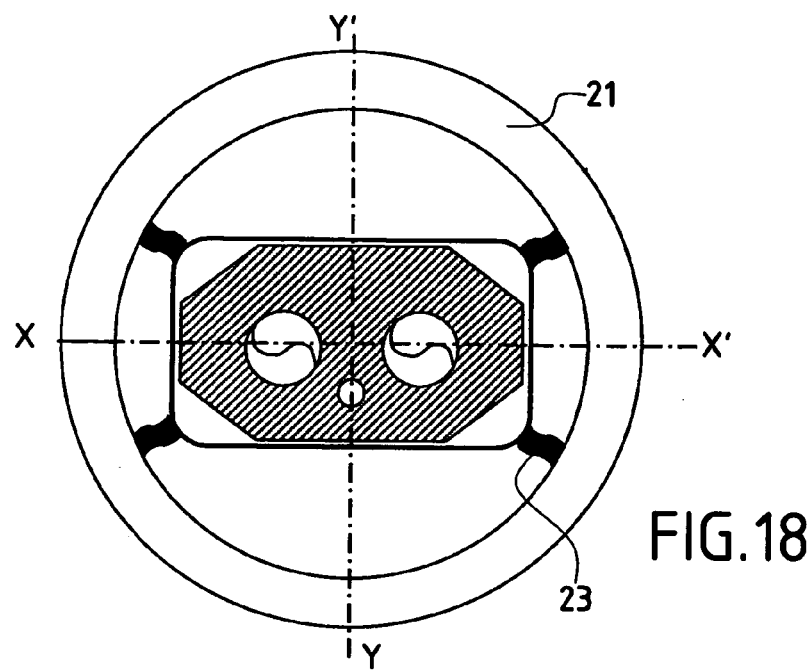
FIGS. 18 and 19 respectively represent the cutaway view (FIG. 18) and side view (FIG. 19) of a device according to the invention including a rectangular envelope with rounded edges equipped with an external screen giving it a circular shape, the small screen being equipped with antivortex helixes.
Figure 19:
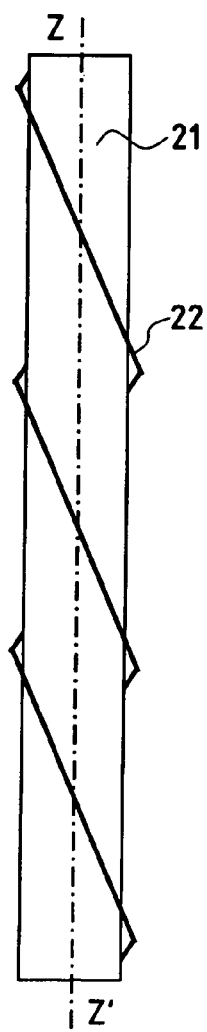

When the device of the invention has an envelope with a rectangular cross section, the shape of this section is subject to high stresses in the high agitation zones close to the surface. This is why in this case it is advantageous to provide, as shown on FIGS. 18 and 19, an external screen 21 providing it with a circular shape, said screen in addition then being equipped on its external surface with a helical-shaped antivortex stabilisation element 22. The device of the invention with a envelope having a rectangular cross section shown on FIG. 18 is rendered integral with the external screen by rubber flexible links 23.

The sealed partitions, centralising jigs 6 and the cooling jigs 7 are preferably embodied from resistant materials not conducting large amounts of heat, such as thermoplastic materials, possibly reinforced, composite materials or even made partially of metal and advantageously being a combination of these techniques.

The largest diameters of the cross sections of the sealed partitions, centralising jigs and cooling jigs is between about 1 and 1.5 m, indeed 2 m in accordance with the overall size of the devices of the invention, also corresponding to envelope thickness of about between 15 and 40 mm in the case of flexible polyethylene or polypropylene thermoplastic envelopes and between 5 and 8 mm in the case of semi-rigid steel or composite envelopes and pipe diameters of about between 100 mm and 400 mm.

The assembling of unit sections 11 so as to form a continuous bundle of several kilometers can be carried out as follows. First of all, a first section is produced with a length, say, of 100 m as shown on FIG. 14 and is equipped with its sealed partitions. In order to do this, the internal pipes are produced from 12 m tube lengths welded end-to-end and are then gradually the centralising and cooling jigs are installed, both being equipped for example with small wheels or runners at their lower portion. Then the unit is inserted into the external envelope 2 by pushing the latter which has been produced as a single element or by the end-to-end joining of envelope units measuring 12 m, 24 m or more, said end-to-end joining being preferably effected far from the extremity of the internal pipes. When the external envelope is in place, said sealed partitions 5 are installed at each extremity where they are been rendered integral with the envelope 2 and the pipes 4 and the insulation material is injected between the sealed partitions. Care shall be taken to allow on the side which needs to be lengthened the external envelope to project by a certain length, such as 20 cm, and the internal pipes 4 for example, the first by 1 m and the second by 1.5 m, so that the zones where the end-to-end joinings to be effected by welding are offset with respect to one another which shall permit access to the welding and control equipment. Then the prefabricated section shall be pulled towards the sea so as to free the working zone and then the next section is produced similarly. When the external envelope is placed around the new section, it is placed opposite with the envelope on stand-by at one extremity of the preceding section and then welded. At the other extremity, a sealed partition 5 is installed and rendered integral with said external envelope and the pipes, and then filling of the insulation material is carried out. Care shall be taken to allow the pipes 4 to project with a slight offset with respect to the external envelope as described above so as to facilitate the control and welding operations and the operation is restarted until a sufficient length is obtained.

If electric or umbilicate cables need to be installed inside the device, an additional pipe playing the role of a sheath shall be added and the cable shall only be pulled through said sheath after the complete assembling of the full sheath length which may reach several kilometers.

In one preferred version of the invention, the insulation complex is advantageously embodied from a reticulated gel possessing great stability, such as a polyurethane compound which reticulation creating an approximately continuous gel plays the role of a matrix within which located is a dispersed liquid such as paraffin, gas oil or any other compound possessing a low level of heat conductivity. Advantageously, during production of the complex, solid compounds shall be incorporated with said complex, said complexes being glass micro-spheres whose role is to reduce the heat conductivity of the complex or fibrous matrices whose role is to reduce the convection of the particles-remaining in a liquid state inside said insulation complex.

The various components are then mixed and energetically squeezed so as to obtain a homogenous compound which can then be injected in liquid form and thus fill the entire section limited by two consecutive sealed membranes. Prior to injection of the fluid insulation material, advantageously a vacuum shall be created in the section so as to avoid any pocket of residual gas. The vacuum created shall result in the envelope locally imploding but the latter shall resume its initial shape as soon as the sufficient required fluid quantity has been injected. Of course, precautions shall be taken to dimension the centralising and cooling jigs and bring them sufficiently close together so that this temporary implosion has no significant repercussions on the behaviour of the external envelope.

The injected homogenised product is found in a liquid state during the filling phase and after reticulation of the binder is transformed into a jellified matrix inside which the other constituent(s) are imprisoned remaining in a liquid state or also in a gel state, which significantly reduces any convection phenomena.

The binding components shall preferably be polyurethanes so that polymerisation only starts after several hours, such as a minimum period of between 6 and 8 hours which, together with reasonable pumping and mixing techniques, makes it possible within this period of time to embody devices 1 m in diameter in unit sections measuring about 100 m.

It is also possible to reduce the unit length or increase it by using smaller or larger injection means, or even use components, possibly added with retarders whose opening time, that is the time during which it can be implemented, is shorter or longer, the main point being that the entire injection operation needs to be ended before the reticulation or jellification reaction of the binder is initiated significantly.

By proceeding in this way, filling of the bundle is considerably simplified as the complicated tasks of the prior art are avoided, these consisting of installing absorbent matrices and causing the insulation fluid to percolate or even of hot-injecting an insulation complex, such as paraffin, subject to significant retraction when it moves from a liquid state to a solid state.

The invention claimed is:

1. Heat insulation device for at least one sub-marine pipe comprising:
   a heat insulation covering surrounding said pipe(s),
   said covering being covered with a sealed protective envelope, and
   said envelope having a tubular shape and a longitudinal axis of symmetry,
   said insulation covering including a material subject to migration and said envelope being constituted by a flexible or semi-rigid material able to remain in contact with the external surface of said insulation covering when the latter warps, said device having:

at least two sealed transversal partitions, each of said partitions being constituted by a closed rigid structure traversed by said pipe(s) and integral with the latter and integral at its periphery with said envelope, and at least one centralizing jig placed between said two successive sealed partitions along said longitudinal axis, said centralizing jig being constituted by a rigid piece integral with said pipe(s) and having a shape permitting a limited radial movement of said envelope on contraction and on expansion with regard to said centralizing jig, said rigid piece of said centralizing jig having an external cylindrical surface in which the perimeter of the cross section stands back with respect to that of said sealed partition and limits the warpings of said envelope by a direct mechanical stop on at least two opposing points of the perimeter of the cross section of said envelope.

2. Device according to claim 1, characterized in that each said sealed transversal partition is constituted by a cylindrical piece having a cross section whose perimeter has the same fixed shape as that of said cross section of the envelope in the absence of warping.

3. Device according to claim 1, characterized in that said transversal partitions are spaced along said longitudinal axis by a distance of between 50 and 200 meters.

4. Device according to claim 1, characterized in that said movement of the envelope opposite said centralizing jig represents a variation of between 0.1 and 10% of the distance between two opposing points of the perimeter of the cross section of said envelope.

5. Device according to claim 1, characterized in that said rigid piece constituting said centralizing jig has one portion of its extreme surface sufficiently standing back with respect to the surface of the envelope and/or has perforations traversing it so as to create a space which allows the transfer of the material constituting said insulation covering through said centralizing jig.

6. Device according to claim 5, characterized in that said cross section of said centralizing jig has the shape of a rectangle whose angles are truncated into cants.

7. Device according to claim 1, characterized in that it comprises a plurality of said centralizing jigs and two successive centralizing jigs are spaced along said longitudinal axis of the envelope by a distance of between 2 and 5 meters.

8. Device according to claim 6, characterized in that it includes a plurality of cooling jigs placed along said longitudinal axis of the envelope, two successive cooling jigs being further spaced by between 20 and 50 meters.

9. Device according to claim 1, characterized in that said rigid piece constituting said centralizing jig includes an open structure formed by spokes arranged radially between a hub constituted by a cylindrical chamber surrounding said pipe(s) and a wheel rim constituting the contact surface of said centralising jig with said envelope.

10. Device according to claim 1, characterized in that said envelope-defines a perimeter having two axes of symmetry and perpendicular to each other and to said longitudinal axis.

11. Device according to claims 10, characterized in that the shape of said cross section of the envelope is circular.

12. Device according to claim 10, characterized in that the shape of said cross section of the envelope is oval.

13. Device according to claim 10, characterized in that the shape of said cross section of the envelope is rectangular.

14. Device for heat-insulating a bundle of sub-marine pipes, characterized in that it includes a device according to claim 1 including at least two of said sub-marine pipes placed in parallel.

15. Working unit heat insulation device so as to obtain a device according to claim 1 via the end-to-end assembling of said unit heat insulation devices, wherein said submarine pipe(s) comprise(s) sub-marine pipe unit elements, characterized in that it includes:

one or all the sub-marine pipe unit elements instead of said sub-marine pipe(s), and an insulation covering, and said protective envelope wherein, each said sub-marine pipe unit element including from, at least one of its extremities, said sealed partition and said centralizing jigs and disposed between two successive sealed partitions.

16. Method for heat-insulating at least one sub-marine pipe, characterized in that heat insulation devices are embodied according to claim 15 and assembled end-to-end.

17. Method according to claim 16, characterized in that said insulation material is a complex material including various components which are mixed and then injected in a liquid state into the various compartments delimited by two of said successive sealed partitions and said insulation material is transformed into a gel via the reticulation, of at least one of its components.

18. Working unit according to claim 15, characterized in that it further comprises cooling jigs and disposed between two successive sealed partitions.

19. Device according to claim 1, characterized in that it includes at least one cooling jig disposed transversally to said longitudinal axis constituted by an open rigid structure integral with said pipe(s) and traversed by the latter and integral with said envelope at its periphery and placed between said two successive sealed partitions along said longitudinal axis said cooling jig having openings allowing the passage of the material constituting said insulation covering through said cooling jig.

20. Device according to claim 6, characterized in that said open structure of said cooling jig includes a cylindrical piece having a cross section whose perimeter is inscribed in a geometrical figure identical to the geometrical figure defined by the shape of the perimeter of the cross section of said sealed partition.

21. Device for heat-insulating a bundle of sub-marine pipes, characterized in that it includes a device according to claim 19 comprising at least two said sub-marine pipes placed in parallel and in that said sealed partitions, cooling jig and centralizing jig keep at least two of said sub-marine pipes at a fixed distance from each other.

* * * * *